No. 733,333. PATENTED JULY 7, 1903.
E. POWELL.
LOOM.
APPLICATION FILED JUNE 10, 1902.
NO MODEL. 11 SHEETS—SHEET 1.
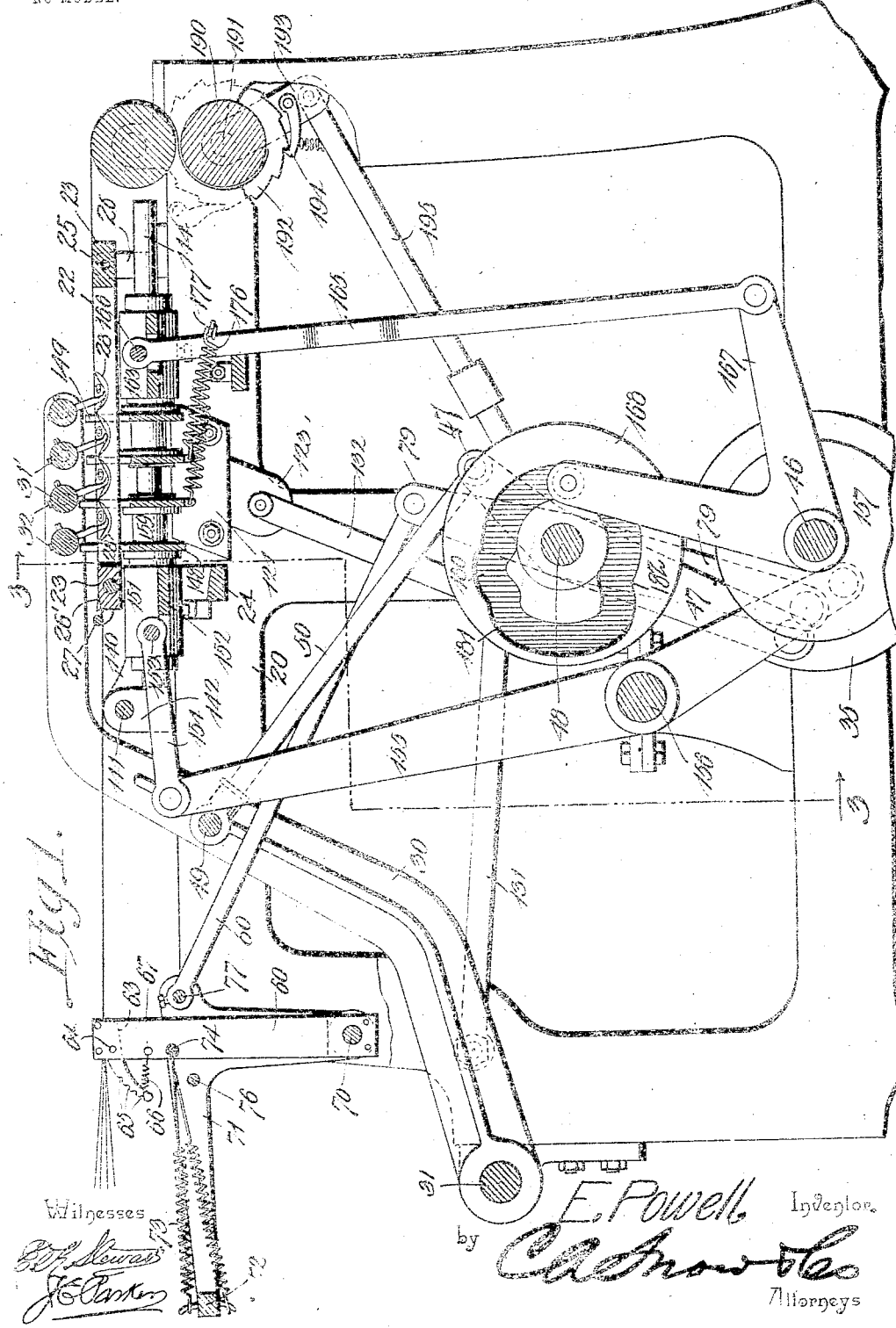
Witnesses
E. Powell, Inventor.
by
Attorneys

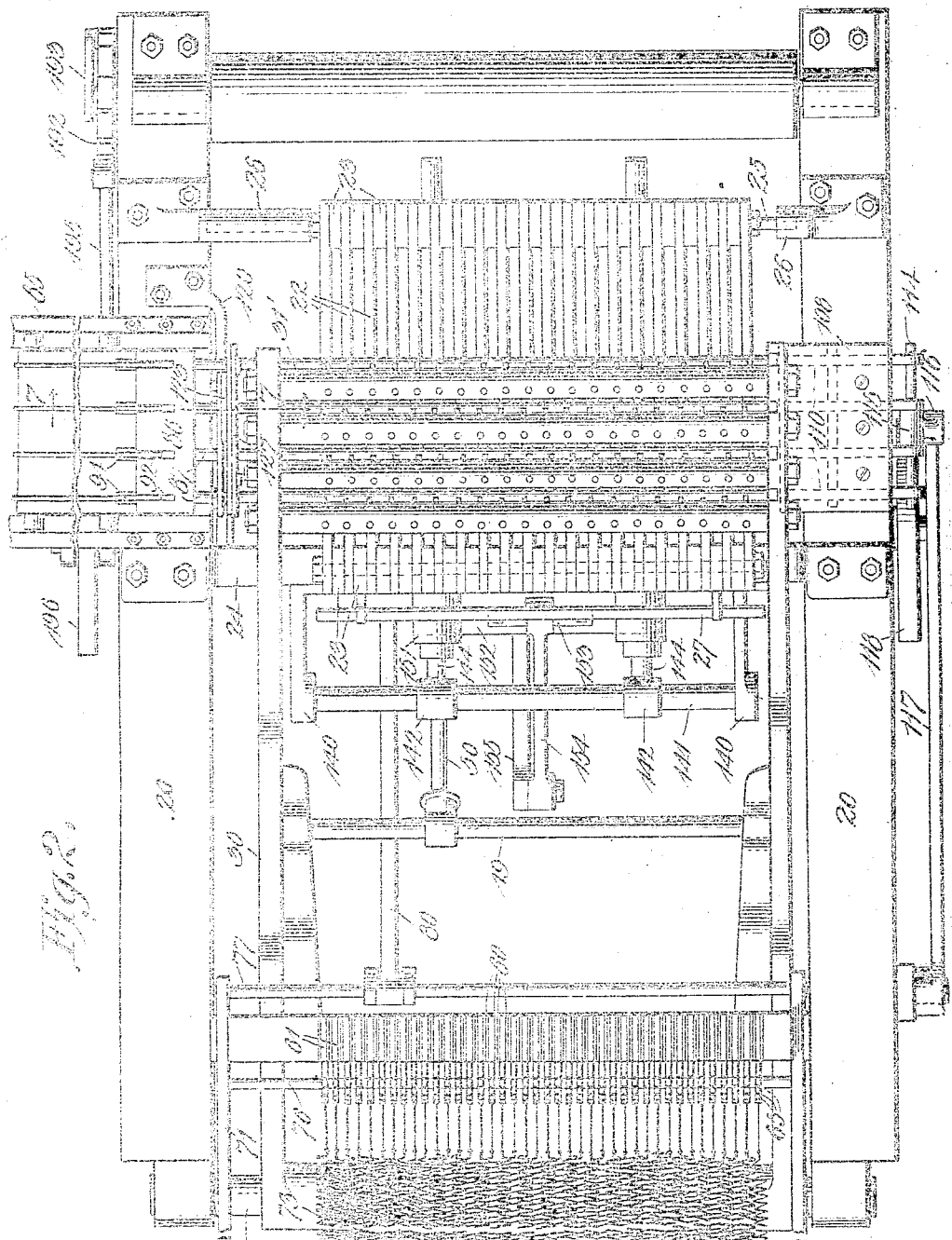

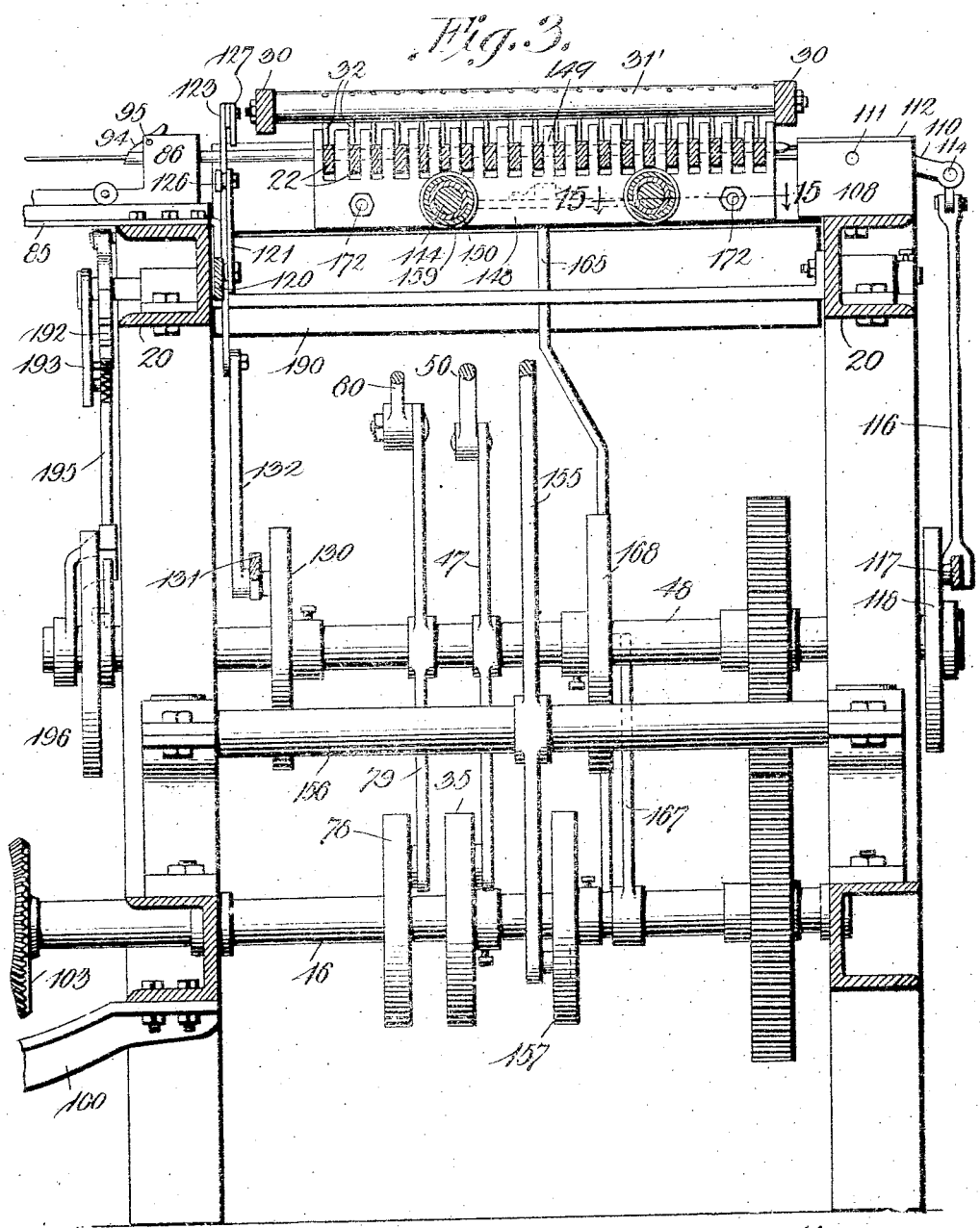

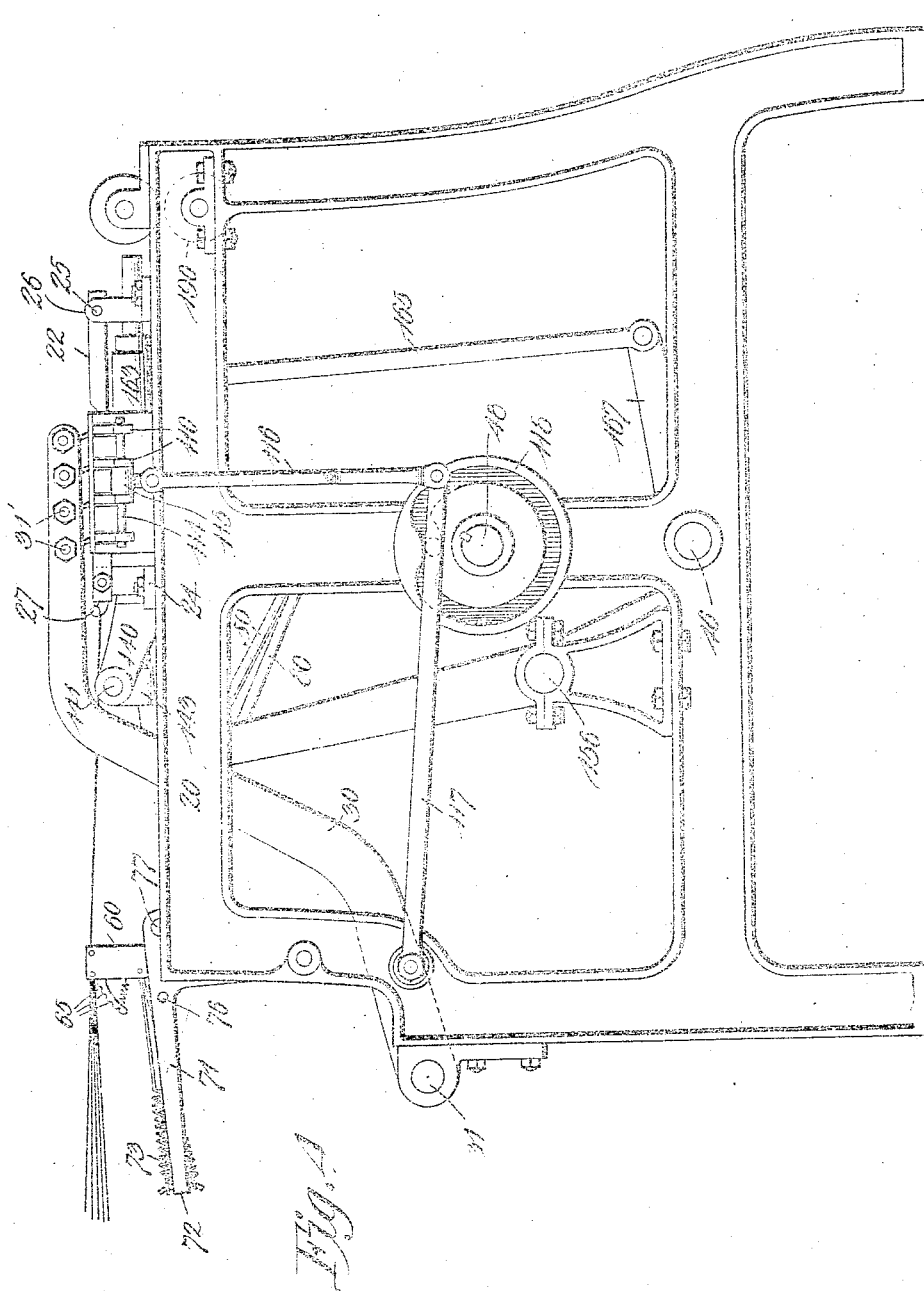

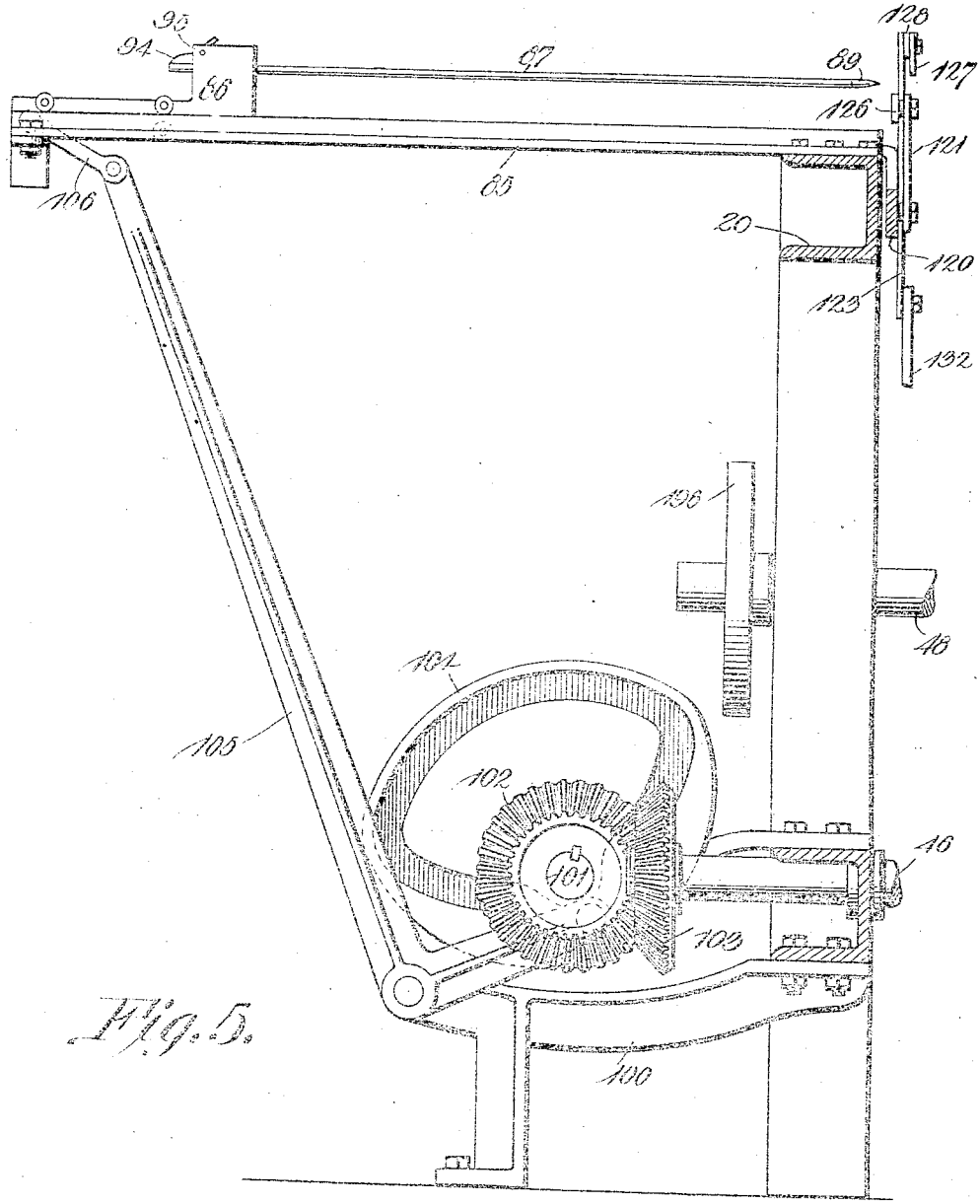

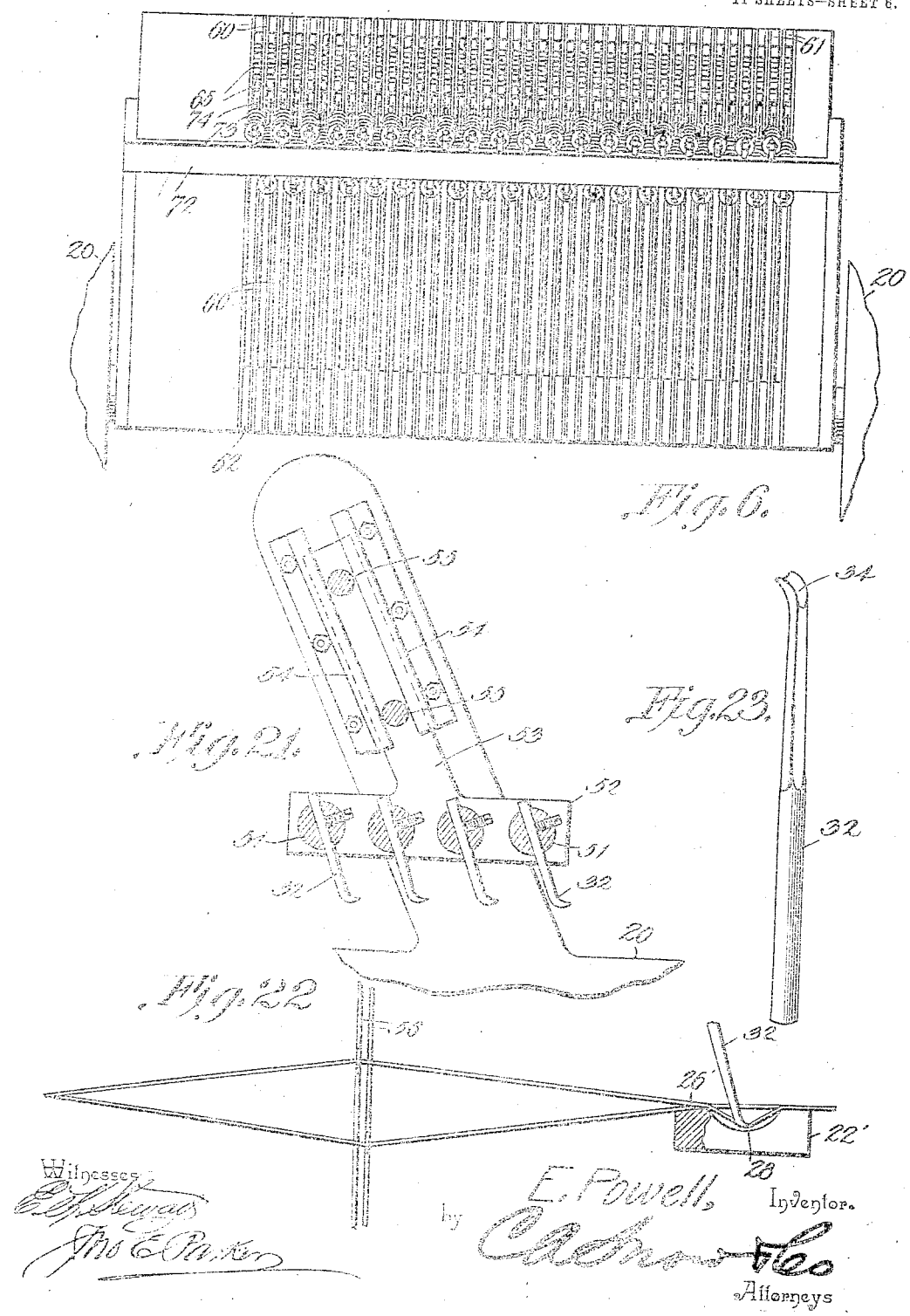

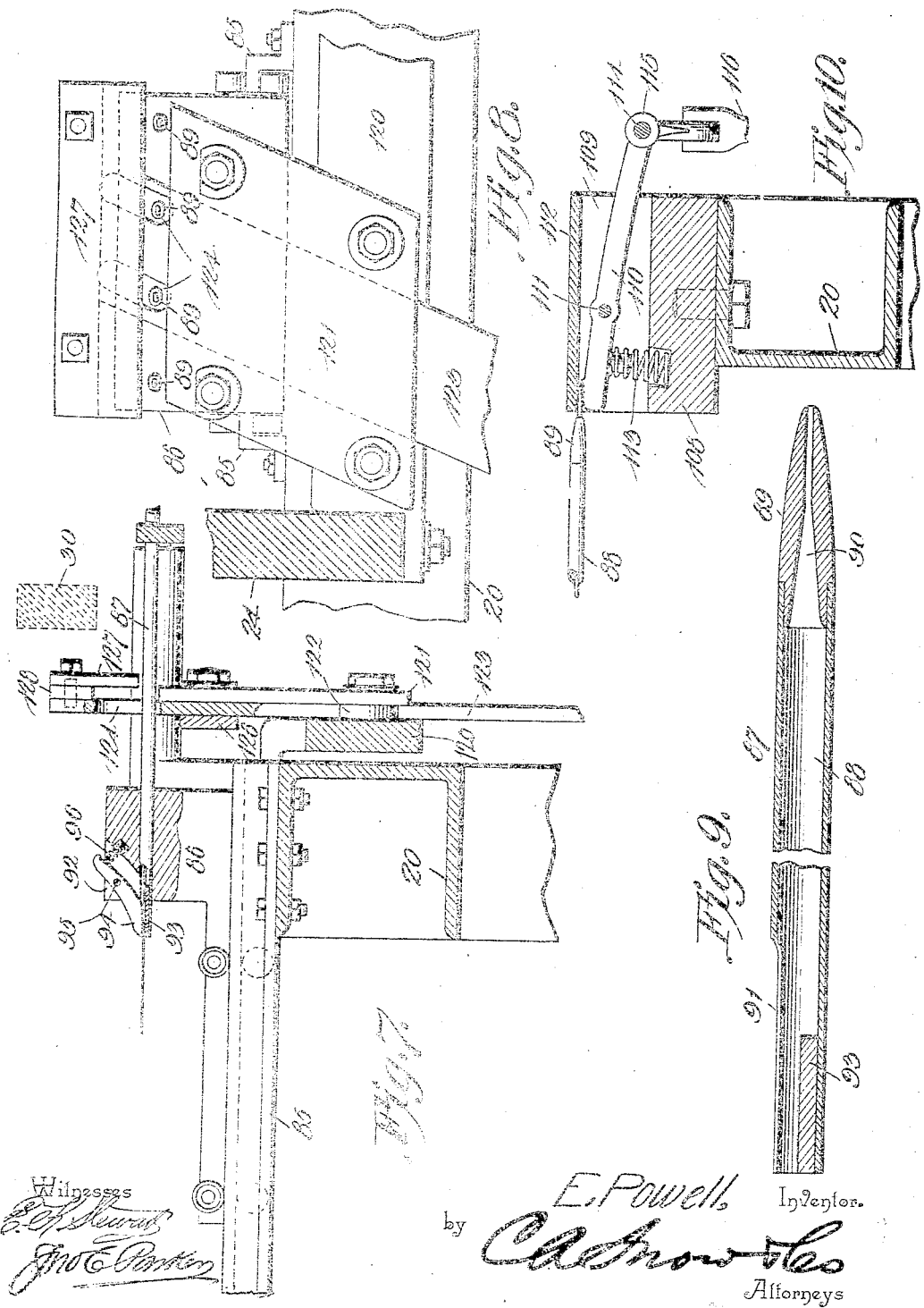

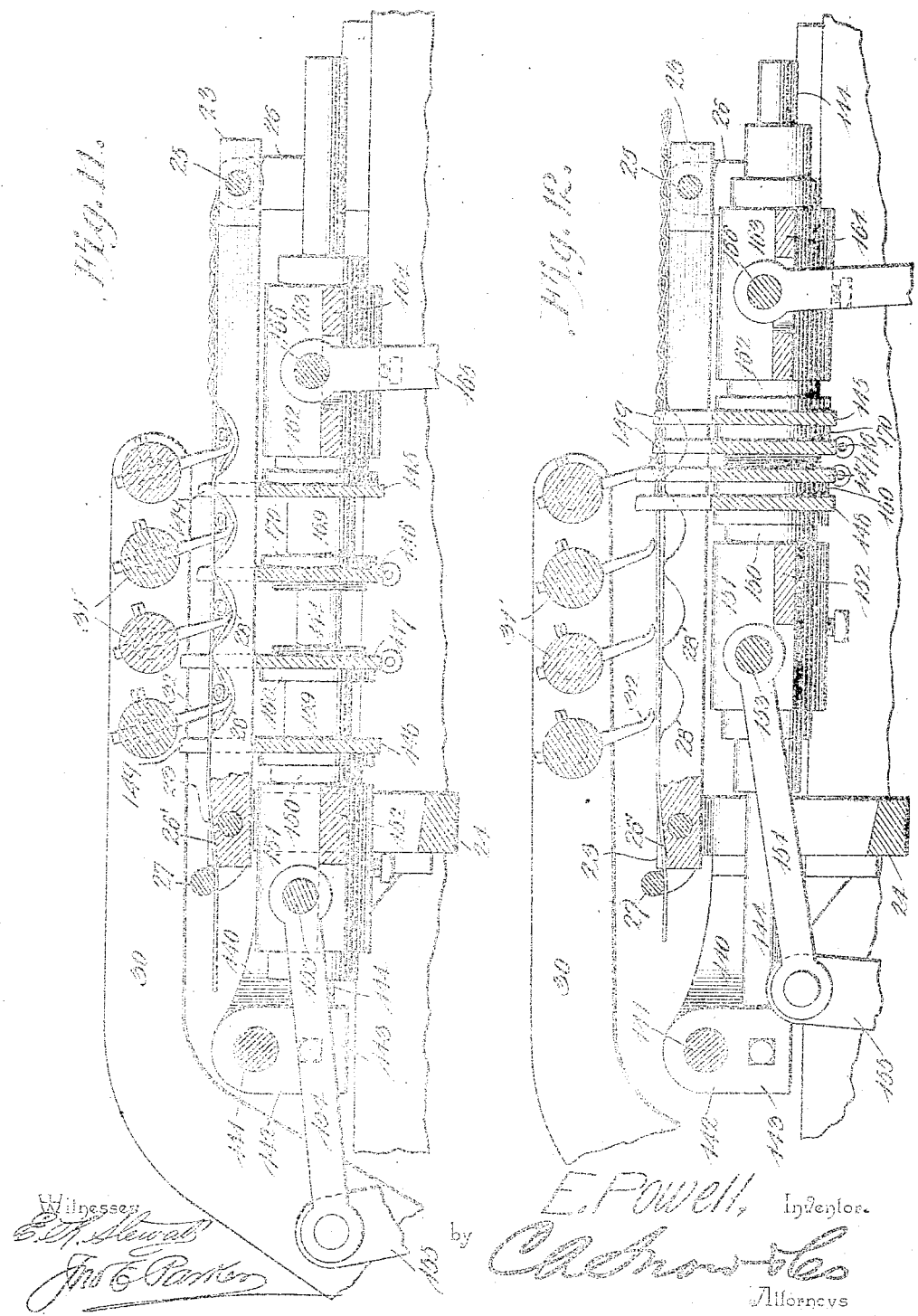

No. 733,333. PATENTED JULY 7, 1903.
E. POWELL.
LOOM.
APPLICATION FILED JUNE 10, 1902.
NO MODEL. 11 SHEETS—SHEET 9.
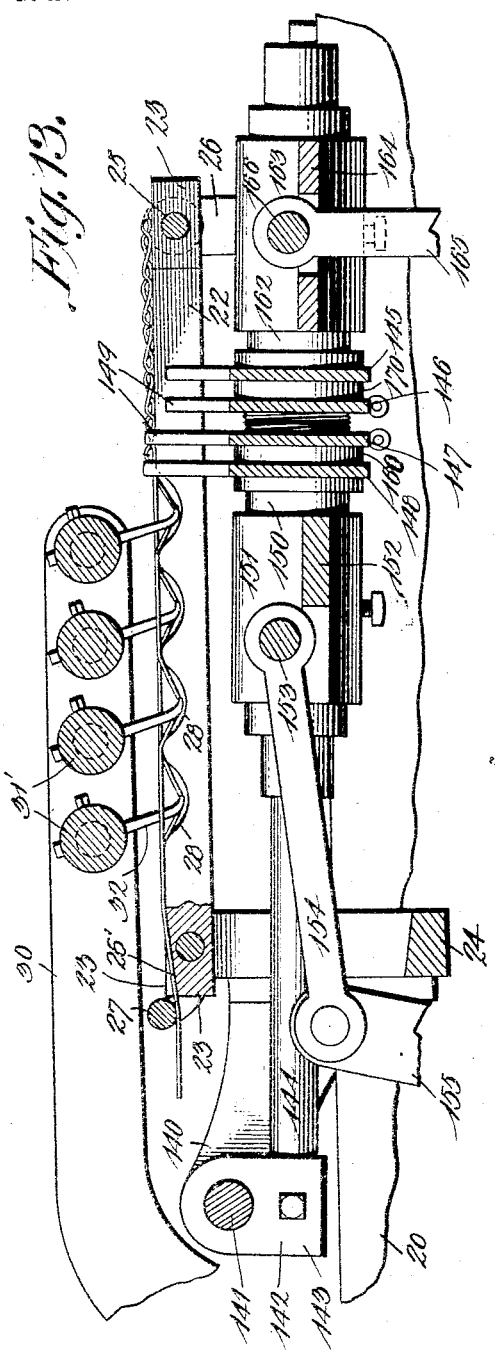
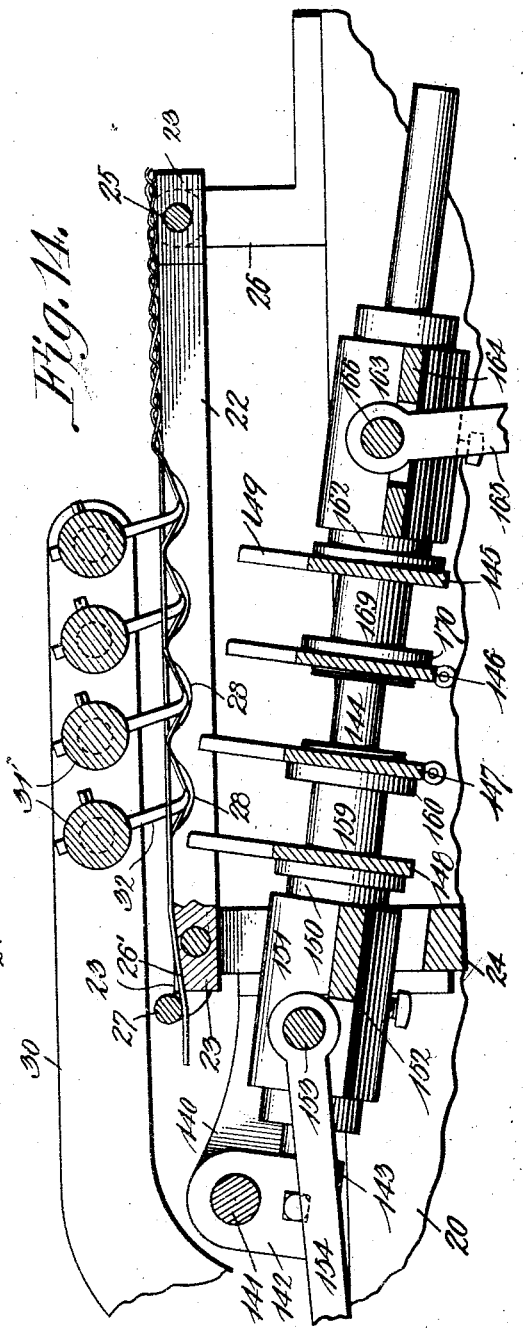
Witnesses
E. Powell, Inventor.
by C. A. Snow & Co.
Attorneys.

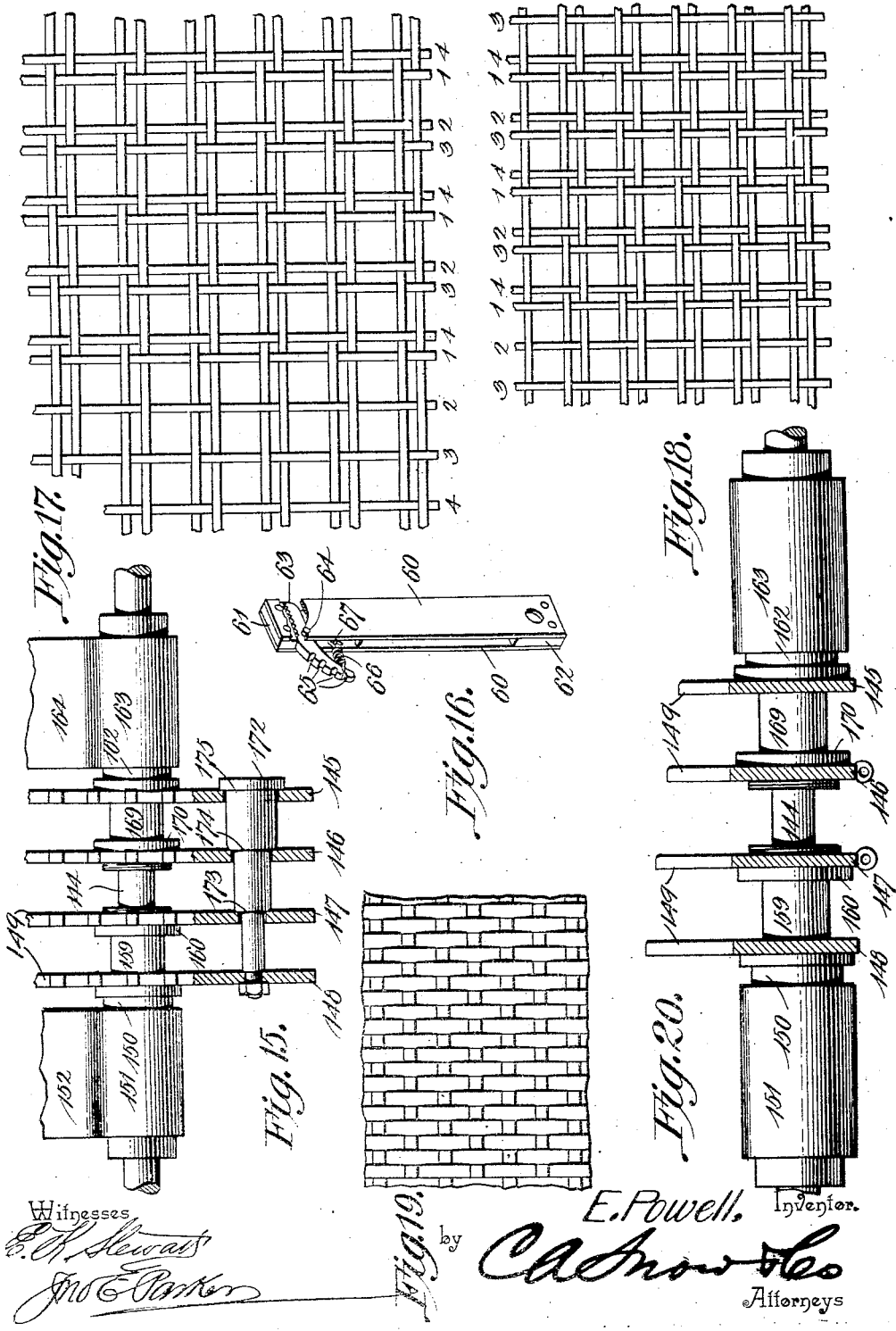

No. 733,333. PATENTED JULY 7, 1903.
E. POWELL.
LOOM.
APPLICATION FILED JUNE 10, 1902.
NO MODEL. 11 SHEETS—SHEET 11.
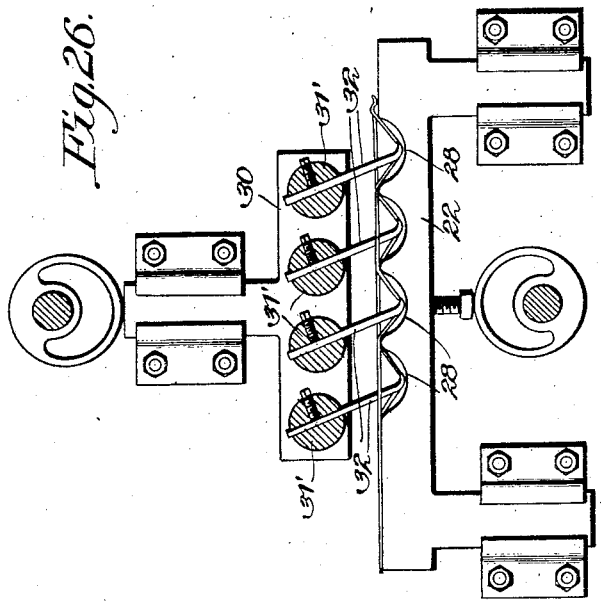
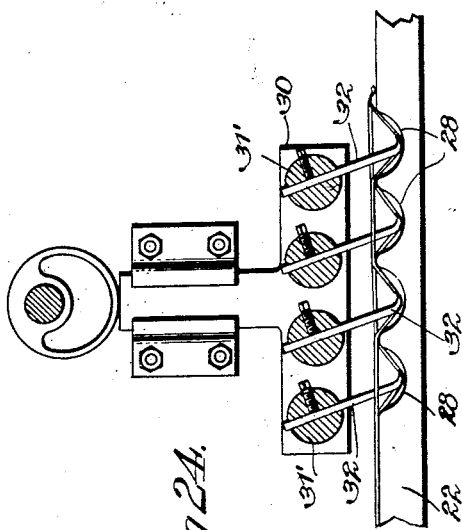
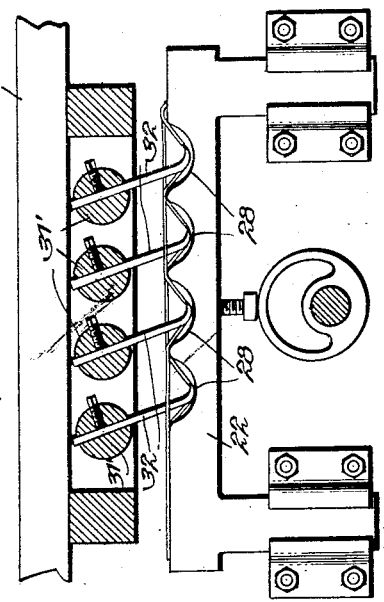

No. 732,833.

Patented July 7, 1903.

UNITED STATES PATENT OFFICE.

EDWARD POWELL, OF FRANKFORT, KENTUCKY, ASSIGNOR OF ONE-HALF TO GEORGE C. REDPATH, OF FRANKFORT, KENTUCKY.

LOOM.

SPECIFICATION forming part of Letters Patent No. 732,833, dated July 7, 1903.

Application filed June 10, 1902. Serial No. 111,035. (No model.)

*To all whom it may concern:*

Be it known that I, EDWARD POWELL, a citizen of the United States, residing at Frankfort, in the county of Franklin and State of Kentucky, have invented a new and useful Loom, of which the following is a specification.

The invention relates to certain improvements in looms, and has for its principal object to increase the capacity of the loom.

To this end the invention consists in means for forming a plurality of sheds at a single operation, simultaneously inserting wefts in all of the sheds, and subsequently beating up the wefts to form the fabric.

The construction of loom as hereinafter described is intended principally for the weaving of cane and ratan fabrics and material of similar nature, such as wire-cloth and wire-slat fabrics; but it is to be understood that the mechanism may also be employed for the weaving of textile or other fabrics of any kind or character without departing from the invention.

In the accompanying drawings, Figure 1 is a longitudinal sectional elevation of a loom constructed in accordance with my invention. Fig. 2 is a plan view of the same. Fig. 3 is a transverse sectional elevation of the loom on the line 3 3 of Fig. 1. Fig. 4 is a side elevation of the loom on a somewhat smaller scale. Fig. 5 is a sectional elevation through one side of the loom and illustrating the construction of the picker-operating mechanism. Fig. 6 is an elevation of a portion of the loom, illustrating the construction of the tension mechanism. Fig. 7 is a longitudinal sectional elevation on the line 7 7 of Fig. 2, illustrating, on an enlarged scale, the construction of a portion of the picking and the cane-severing mechanism. Fig. 8 is a front elevation of the same. Fig. 9 is a detail view of one of the pickers on an exaggerated scale. Fig. 10 is a detail sectional view of one of the cane-gripping devices for holding the cane during the return movement of the pickers across the shed. Figs. 11, 12, 13, and 14 are detail sectional views drawn to an enlarged scale and illustrating the position of the parts during several steps of the picking, the beating-up, and the shed-forming operations. Fig. 15 is a sectional plan view on the line 15 15 of Fig. 3, illustrating, on an enlarged scale, a portion of the beating-up mechanism. Fig. 16 is a detail perspective view of one of the tension devices detached. Figs. 17, 18, and 19 are views of different form of fabric weaves which the loom is designed to make. Figs. 20, 21, and 22 are views of modifications. Fig. 23 is a detail perspective view of one of the shedding-fingers. Fig. 24 is a view, partly in the nature of a diagram, illustrating a plurality of shed-forming fingers having reciprocating movement in a vertical plane. Fig. 25 is a similar view showing the shedding-bars having vertical movement. Fig. 26 is a similar view showing both the fingers and bar provided with means for imparting reciprocating movement to form sheds.

Similar numerals of reference are employed to indicate corresponding parts throughout the several figures of the drawings.

The supporting-frame for the operative parts of the mechanism comprise opposite side frames 20, connected by suitable tie-bars and provided with journals for the reception of the several shafts of the driving mechanism.

At the top of the frame are arranged a series of what may be termed "shedding-bars" 22, extending longitudinally of the machine or in lines parallel with the line of the warps and spaced from each other by spacing blocks or disks 23. At one end the shedding-bars and spacing-blocks are supported by a cross-bar 24, having its opposite ends bolted to the tops of the side frames, and at the opposite ends of the shedding-bars is a transversely-disposed tie rod or bar 25, supported by brackets 26, carried by the opposite side frames. The space between the opposite side frames is greater than the greatest width of fabric to be made, and the shedding-bar supports are so arranged that the number of shedding-bars may be increased or diminished in accordance with the width of the fabric to be woven.

In weaving fabrics in general and especially in the weaving of cane fabrics, such as illustrated in Figs. 17 and 18, the warps are arranged in pairs and the wefts are inserted successively in single sheds and beaten up into place. In the fabric shown in Figs. 17 and 18 the warps and wefts are disposed in closely-related pairs separated by a comparatively large mesh, this being the fabric as it comes from the loom and the finished fabric being provided with additional pairs of diagonally-disposed strands, which are generally inserted by hand. As the present machine is designed for the weaving of the preliminary fabric comprising the straight parallel warps and the pairs of transverse wefts, each of the bars 22 is of a width slightly greater than the distance between the outer edges of a pair of warps, and the space between each two shedding-bars represents, approximately, the width of the mesh of the resultant fabric. In practice, therefore, two warps, constituting a pair, will be guided directly over each of the shedding-bars, and to assist in guiding the warps to proper position the rear ends of said shedding-bars, or that end nearest the warp-beam, are provided with inclined grooves 26', into which the warps are depressed by a transversely-disposed bar 27, extending across the line of warps at a point to the rear and slightly below the upper surface of the shedding-bars.

In each of the shedding-bars are recesses 28 of a width sufficient to permit the formation of a shed, the ribs formed between adjacent recesses being preferably rounded in order not to injure the warps and to facilitate the entrance of the latter into the recesses. Each bar contains a plurality of recesses for the formation of sheds, the number being unimportant and dependent to some extent on the strength and flexibility of the warps. In weaving ratan fabrics it has been found that four sheds may be safely formed at each operation; but this number may be increased or diminished without departing from my invention.

The warps are fed from a suitable warp-beam (not shown) through a tension device hereinafter described and thence over the several shedding-bars to the take-up rollers, on which the finished fabric is wound. Where four shed-forming recesses are employed, one warp of the pair on each shedding-bar will be depressed into alternate recesses and will pass over the remaining recesses in a horizontal plane, while the mating warp of each pair will be depressed into the remaining recesses and will extend in a horizontal plane over those recesses into which the first warp is depressed, thus forming four parallel sheds, through which an equal number of wefts are passed.

The coöperative portion of the shed-forming mechanism may be of any desired construction, having devices for engaging and depressing the proper warps at predetermined intervals. A preferred form of mechanism is that illustrated in the drawings, wherein 30 designates a pair of rocker-arms arranged one at each side of the machine within the side frames and connected to a transversely-disposed rock-shaft 31. The upper portions of these arms are arranged in a substantially horizontal plane when in shedding position and at a point above the shed-forming bars are provided with a series of transversely-disposed rods 31' of a number equal to the number of shed-forming recesses. Each rod is provided with a plurality of diametral openings through which extend warp-engaging fingers 32, confined in place by suitable set-screws or other securing devices. When in shed-forming position, the rods are disposed in planes slightly to the rear of the central portions of the respective recesses, and the warp-engaging fingers are inclined and are provided with forwardly-projecting foot portions, which serve to engage the warps at points a trifle to the rear of the exact center of the recesses, this being for the purpose of leaving the shed as nearly unobstructed as possible to permit the free passage of the weft-carrying pickers, needles, shuttles, or other devices employed to insert the wefts into the sheds. In cane fabric the rounded upper face of the ratan is highly glazed, and to prevent side slipping the engaging portions of the shedding-fingers are provided with curved recesses 34.

While in some cases it may be preferred to support the shed-forming fingers on a frame having a vertical or substantially vertical movement, the rock-levers are preferred for the reason that in engaging the warps they tend to some extent to feed the warps forward in the direction of the finished fabric, the cane being drawn from the warp-beam and unnecessary tension between the fabric and the shed-forming mechanism being thus avoided. The construction, moreover, is such that while the forming of the sheds is practically simultaneous the fingers carried by the rear rod of the series will first engage the warps, and the action of the remaining fingers will be successive rather than simultaneous in the strict sense of the word. In effect, however, the shedding is simultaneous, and all of the sheds are open to the same extent and are held in the open position until the wefts are inserted in place.

To operate the shed-forming fingers, I employ a cam 35, mounted on the main cam-shaft 46 of the loom and adapted to operate on a cam-lever 47, pivoted on an auxiliary shaft 48 and connected at its upper end to a cross-bar 49 by means of a link or rod 50. The cross-bar 49 extends between and connects the two rock-levers 30, and this construction is found to operate successfully in comparatively narrow looms; but in broad looms, such as might be employed for the weaving of textile or other fabrics, the cams and cam-levers will be duplicated at the opposite sides of the loom.

A modification of the shed-forming mechanism is illustrated in Fig. 21, wherein the shed-forming fingers 32 are carried by transversely-disposed bars 51, mounted on a frame 52, having a cross-head or guiding-block 53, adapted to fixed guideways 54, a cross-head and pair of guideways being situated at each side of the loom and connected by cross-bars 55, to which motion will be imparted by any suitable operating mechanism. The movement of the frame and shed-forming fingers in an inclined plane will result in an operation similar to that effected by the movement of the rock-levers, the cane forming the warps being fed slightly forward in the direction of the finished fabric. This may be further modified by imparting a vertical movement to the shed-forming fingers or in some cases by employing stationary shed-forming fingers and imparting vertical movement to the shedding-bars, or each may receive movement and the wraps engaged from both above and below or operated upon in any manner whatever for the purpose of forming a plurality of sheds.

Fig. 24 illustrates a construction in which the shed-forming fingers are provided with means for imparting vertical movement thereto, and in Fig. 25 is illustrated a mechanism for imparting vertical movement to the shedding-bars.

Fig. 26 illustrates a further modification in which both the fingers and shedding-bars receive vertical movement for the purpose of forming a plurality of sheds.

A simple method of forming a multiple shed is that indicated in Fig. 22, wherein the shedding-bars 22' are provided with a single row of shed-forming recesses adapted to coöperate with a single row of shed-forming fingers 32. After passing under the warp-tension devices the warps are engaged by heddles, as indicated at 56, said heddles being of any ordinary construction and operated in the usual manner to form a shed, while a second shed is formed by the fingers 32 and the shedding-bars 22'. Each of the warps passes through a tension device of the character shown in detail in Fig. 16, each tension device comprising a pair of parallel plates 60, slightly separated from each other by end blocks 61 and 62, the upper block forming a gripping-jaw, with which coacts a pivoted gripper 63, mounted on a pin 64, carried by the side plates and having in its curved and rearwardly-extending outer end a series of notches 65 for the reception of the end of a spring 66, having its opposite end secured to a pin 67, carried by the side plates. The construction is such that the tensional strain exerted by the spring may be adjusted by moving the spring to the desired notch 65, and thus increasing or decreasing the grip on the warps. Through the lower block 62 and the lower portions of the side plates extends a transversely-disposed rod 70, having its opposite ends secured to the side frames of the loom and forming a fulcrum-point for all of the tension-frames. At a point between the outermost tension-frames and the side frames of the loom are two L-shaped frames 71, pivotally mounted on the cross-bar 70, the rear ends of said frames being connected by transversely-disposed cross-bars 72, from which extend a series of springs 73, a separate spring extending to each of the tension-frames and being connected thereto by means of a suitable pin 74, carried by the side plates 60. The frames 71 are further connected by a pair of cross-bars 76 and 77, extending one on each side of the row of tension devices and serving as stops for limiting the independent movement of the tension-frames. Immediately before or during the first part of the shedding movement of the fingers 32 the frames 71 and all of the tension devices are swung forward in the direction of the finished fabric in order to provide sufficient slack to form the sheds, and this movement is imparted by means of a cam 78, mounted on the main cam-shaft 46 and connected through a pivoted arm 79 and a link 80 to the forward stop-bar 77. In the operation of this portion of the mechanism the cam operates to move all of the tension-frames forward by first imparting movement to the frames 71 and thence through the stop-bars 76 to the individual tension-frames. The multiple shed is then formed and the slack being taken up by the downward movement of the shedding-fingers. After the insertion of the wefts, as hereinafter described, the shed-forming fingers are raised to release the warps, and the cam then moves to return the tension-frames to their initial position. During the ordinary operation of the loom each warp is separately confined by one of the tension-frames, and each is held under exactly the same tension without regard to variations in thickness of the ratan. The tension-frames may be returned to initial position at any time after the formation of the shed, and, if necessary, the return movement may be made immediately after the downward movement of the shedding-fingers is effected.

The picking mechanism is illustrated in detail in Figs. 5, 7, 8, 9, and 10. On one side of the frame of the loom is a guide 85, extending at a right angle to the length of the loom-frame and adapted for the reception and support of a picker-block 86, to which are secured a number of pickers or needles 87 equal to the number of sheds formed at each operation. In the present instance four sheds are formed at each movement of the shedding mechanism, and the picker-block carries four pickers or needles, each of the character more clearly illustrated in Fig. 9 and comprising a tubular body portion 88 of a length somewhat greater than the width of the fabric. At the forward end of the needle is a pointed block 89, formed of tool-steel or other hardened metal and provided with a central opening 90, preferably elliptical in cross-section in order that it may suitably guide the strips of ratan forming the weft. The rear end of the pickers or needles is secured in a suitable opening formed in the picker-block and projects somewhat beyond the rear face of the block. The upper portion of the tube is slotted, as indicated at 91 in Fig. 9, said slot being in vertical alinement with a slot 92, formed in the picker-block. In the lower portion of each tube is secured a gripper-block 93, formed of hardened tool-steel and adapted to coact with a movable gripping-jaw 94, pivotally mounted on a stud 95 and normally pressed in the direction of a stationary jaw 93 by means of a compression-spring 96, seated in the slot in the picker-block. Each of the picker or needle tubes is mounted in the same manner, and each is provided with a stationary jaw, and the picker-block is provided with a corresponding number of movable jaws. Mounted in a suitable bracket 100 below the picker-block guide is a shaft 101, carrying a bevel-gear 102, which receives motion from a bevel-gear 103, secured to the main cam-shaft 46. To the shaft 101 is secured a grooved cam 104, adapted to act on one arm of a pivotally-mounted bell-crank lever 105, the opposite arm of which is connected by a link 106 to the picker-block. The cam is so constructed and operated as to impart a reciprocating movement to the picker-block to force the several pickers or needles through the sheds to the opposite side of the fabric, where the protruding ends of the weft, carried by and extending through the needles, are caught and held by gripper-jaws, Fig. 10, which close upon the end of the weft and hold the same during the returning movement of the pickers or needles. During the forward movement of the pickers across the shed the strips of ratan are held by the movable jaws 94, carried by the picker-blocks, a portion of the ratan projecting beyond the pointed ends of the picker. On that side of the frame opposite the picker-block guide is secured a block 108, having in its upper face a series of slots 109 of a number equal to the number of sheds, and in each of said slots is a pivotally-mounted gripper-jaw 110, a single pivot-pin 111 passing entirely through the block and forming a fulcrum for all of said jaws. The upper or stationary jaw of this set of grippers is formed by a strip of tool-steel 112, secured to the upper face of the block 108 and extending over all of the slots 109. The jaws 110 are held in closed position by compression-springs 113, and the rear ends of all of such jaws are connected by a pin 114, on which is mounted a sleeve 115, connected by a link 116 to a cam-lever 117, the latter carrying an antifriction-roller adapted to a grooved cam 118 on the auxiliary cam-shaft 48. The cam 118 is so timed as to open the gripper-jaws before the projecting ends of the ratan are presented thereto by the pickers and to close upon and hold the ratan during the returning movement of the pickers.

As soon as the shedding-fingers raise and the shed closes upon the wefts the gripper-jaws are opened and the ratan released.

On that side of the loom carrying the picker-block mechanism is bolted a stationary bar 120, said bar being arranged within and parallel to the side frame and one end of said bar being secured to the transversely-disposed shedding-bar supports and the opposite end to the side frame or other suitable support. To this bar is secured a cutting-blade 121, the latter being spaced inwardly from the bar by spacing-blocks or washers 122, through which the securing-bolts are passed. The blocks 122 serve as guides for an inclined knife-carrying bar 123, which extends up beyond the plane of the pickers and is provided with suitable slots 124, which will not interfere with the movement of the pickers. The upper portion of the knife-carrying bar 123 is further guided by a cross-bar 126, extending around the rear face of the knife-carrying bar and having its opposite ends bolted to the stationary cutting-blade 121. To the upper end of the knife-carrying bar is secured a cutting-blade 127, inwardly spaced from the carrying-bar by a block 128 of the same thickness as the stationary blade 121.

To impart reciprocating movement to the knife-carrying bar, I employ a grooved cam 130, mounted on the auxiliary cam-shaft 48 and adapted for the reception of a pin or antifriction-roller mounted on a cam-lever 131, having one end fulcrumed to the frame of the machine. The cam-lever is connected by a link 132 to the lower portion of the knife-carrying bar and is operated to draw the knife downwardly and sever the cane immediately after the pickers return to normal position after a weft-inserting movement and after the shed has closed, it being desirable to defer the severing operation until the sheds have closed upon the wefts while the latter are still under the tension of the gripper-jaws 94.

In practice I may employ any form of picker, needle, shuttle, or other weft-introducing device in ordinary use in looms and may employ any ordinary form of severing mechanism arranged at either side of the loom in accordance with the character of the picking mechanism, or in some cases, especially where the wefts are formed of yarn or similar material, the wefts may be carried along from shed to shed to form a selvage and without severing each separate shot.

In the weaving of ratan fabrics the wefts are usually supplied in the form of rolls, each containing sections of ratan glued or otherwise secured together in a continuous length, a sufficient quantity being severed at each operation to form the wefts. In some cases, as where the wefts are in the form of wooden or other slats, as in the manufacture of a wire-slat fabric, the wefts are previously cut to a uniform length and automatically fed to the sheds. Mechanism of this character is well known to those skilled in the art and does not require detailed description.

The several sheds may be formed at regular or irregular intervals, as desired, but for the sake of convenience are generally spaced at equidistant intervals, the beating-up mechanism being so constructed and operated as to force the wefts to their proper position in the completed fabric to form a mesh of any desired size or to form a closely beaten-up fabric in accordance with the character of the fabric being made. In the weaving of a ratan fabric, such as shown in Figs. 17 and 18, where the wefts are arranged in pairs separated by an intervening mesh-forming space, it is preferred that the four wefts inserted at each operation shall be placed in the fabric in the 1, 2, 3, 4 order shown, the first weft representing the last or final weft of one pair, Nos. 2 and 3 the two wefts forming a single pair, and No. 4 the first weft of a succeeding pair. The order may be different and the four wefts beaten up in such manner as to form two pairs; but the order named is preferred and has been found more successful in actual practice. Where five or six or more wefts are beaten up at a single operation, the order may be changed or varied in accordance with the nature of the fabric, and in the weaving of a close-mesh fabric, such as shown in Fig. 19, or in the manufacture of a textile or other fabric of the same or of different character the wefts may be beaten up simultaneously or successively or partly simultaneously or partly in successive order without departing from my invention.

The construction of the beating-up mechanism which it is preferred to employ is best shown in Figs. 11, 12, 13, and 14. To the rear face of the shedder-bar support 24 are secured two brackets 140 for the support of a transversely-disposed shaft 141, on which are hung collars 142, having depending lugs 143, carrying longitudinally-disposed spindles 144, which extend under the shedding-bars and are arranged longitudinally of the machine. These spindles serve to support four transversely-disposed beating-up combs 145, 146, 147, and 148, each of which carries upwardly-projecting beating-up teeth or fingers 149, extending between the shed-forming bar 22 and serving to engage with and move the several wefts to proper position in the finished fabric. The forward faces of all of the beating-up fingers are slightly curved to facilitate the movement of the fingers in leaving the wefts and for a reason hereinafter described, the two combs 145 and 146 are provided with beating-up fingers somewhat shorter than those carried by the two rear combs 147 and 148. To the rearmost comb or beating-up bar 148 is secured a sleeve 150, one of such sleeves being disposed near each end of the bar at points concentric with the spindles 144. The sleeves 150 are rigidly secured in openings formed in collars 151, carried by a frame 152, said frame being in the form of a transversely-disposed cross-bar, having a slotted central portion and provided with a fixed pivot-pin 153, on which is mounted one end of a link 154, the opposite end of said link being connected to a cam-lever 155, mounted on a stud 156 and having its lower end in engagement with the groove of a cam 157, mounted on the main cam-shaft 46, said cam being adapted to impart a reciprocating movement to the cross-bar 152 and the sleeve 150 to effect the beating-up operation. To the beating-up bar or comb 147 is secured the threaded end of a sleeve 159, the rear end of which is free to slide in the sleeve 150, contact between the two bars 147 and 148 being prevented by a collar or flange 160, carried by the sleeve 159, said collar or flange being of a width equal to the width of the mesh between the strands 1 and 2 or the strands 3 and 4 of the ratan fabric illustrated in Figs. 17 and 18. The sleeve 159 slides freely on the spindle 144 and is freely movable within the sleeve 150, carried by the movable frame 152. To the beating-up bar 145 is secured a sleeve 162, one of such sleeves being disposed near each end of the bar and having its axis coincident with one of the spindles 144. The two sleeves are rigidly secured in collars 163, carried by a movable cross-bar 164, having a centrally-disposed slot for the passage of a link 165, pivoted on a stationary pin 166, carried by the cross-bar. The lower end of the link 165 is connected to one arm of a bell-crank lever 167, fulcrumed on the main cam-shaft 46, the opposite arm of said bell-crank lever being provided with an antifriction-roller adapted to a grooved cam 168, carried by the auxiliary cam-shaft 48. The cam 168 is employed to impart a downward movement to the beating-up fingers when the latter have moved the wefts to proper position in the fabric and to hold said fingers below the warps during the return movement to initial position, the cam then acting to raise the fingers to position behind the several shed-forming recesses in the shedding-bars 22. To the beating-up bar 146 is secured a collar 169, adapted to slide on the spindle 144 and guided within the fixed collar 162 of the front comb or bar 145. The collar 169 is provided with a flange 170 of a width equal to that of the flange 160 and for a similar purpose, and the threaded ends of the sleeves 159 and 169 project inwardly beyond the inner walls of the beating-up bars 147 and 146, respectively, each for a distance equal to one-half the thickness of the flanges 160 and 170, so that when the several beating-up bars are closed to the position shown in Fig. 12 they will be separated from each other for distances equal to the width of the mesh of the fabric shown in Figs. 17 and 18.

Referring now to Fig. 15, which illustrates the several beating-up bars in sectional plan, 172 designates a bolt rigidly secured to the rearmost beating-up bar 148 and extending through openings formed in the remaining bars 147, 146, and 145. The bolt is provided with a plurality of shoulders 173, 174, and 175, against which the respective bars are held to prevent excessive spreading movement of said bars without, however, interfering with the free closing movement of the bars. When the parts are in the position illustrated in Figs. 1 and 11, the two intermediate bars 146 and 147 are held against their respective shoulders on the bolt by means of springs 176, extending from said bars to holding-arms 177, projecting laterally from the link 165, while the end bars are maintained in proper position by reason of their rigid connection with the collars 151 and 163, respectively. In the operation of this portion of the mechanism, the parts being in the position illustrated in Fig. 11, with the sheds formed and the pickers inserting the several wefts, the beating-up bars are held stationary until the pickers have left the sheds and the latter have closed on the inserted wefts. The cam 157 then operates to push the transverse bar 152 in the direction of the woven fabric, causing the rear bar 148 to engage weft No. 4 and to move the same until the bar comes into contact with the flange 160 on the sleeve 159. Motion is then imparted to the beating-up bar 147, causing the same to engage weft No. 3 and to travel said weft until the threaded portion of the sleeve 159 abuts against the sleeve 160. The bar 146 is then moved until it engages weft No. 2 and travels the same forward until the flange 170 comes into contact with the foremost beating-up bar 145, after which all of said bars are traveled and all of the wefts moved in a horizontal line in the manner indicated in Fig. 12. When the foremost beating-up bar has deposited weft No. 1 and the second bar has deposited weft No. 2 in proper position in the finished fabric, wefts Nos. 3 and 4 are still spaced at distances apart equal to the width of the mesh and it becomes necessary to move wefts Nos. 3 and 4 until No. 3 assumes a mating position with weft No. 2 and weft No. 4 is left in the fabric in position to form the first of a succeeding pair of wefts. To accomplish this, the cam 168 is brought into play, the portion 180 of said cam coming into engagement with the antifriction-roller of the cam-lever 167 and causing a downward movement of all of the beating-up bars until the two forward bars 145 and 146 are below the fabric, as illustrated in Fig. 13. As previously described, the teeth or fingers of the bars 145 and 146 are somewhat shorter than the corresponding teeth of the bars 147 and 148, so that the latter still remain in contact with wefts Nos. 3 and 4 and receive an additional impulse from the cam-lever 155, resulting in a movement of wefts Nos. 3 and 4 to proper position in the finished fabric. When the fabric has been properly beaten up, the portion 181 of cam 168 gives a further downward movement to all of the beating-up bars and moves the bars below the fabric, said bars being held in a plane below the fabric and warps by the long dwell of the portion 181 of the cam during the time the cam 157 is returning all of the beating-up bars to the position shown in Fig. 14. When this position is reached, the portion 182 of cam 168 raises all of the beating-up bars to the initial position shown in Fig. 11. During the first part of the return movement of the transverse bar 152 it draws the bar 148 and the bolt 172 to the rear until the shoulder 173 of said bolt engages the bar 147, the bars 147 and 148 being thus spaced to shed-forming position. Continued movement on the part of the bar 148 brings the shoulders 174 and 175 of the bolt into engagement, respectively, with the beating-up bars 146 and 145, all of such bars being properly spaced before the final returning movement commences, so that said bars will be in proper position to be moved upward to the rear of the respective sheds when the position indicated in Fig. 14 is reached. It will be noted that at about the time the beating-up bars are finally leaving the fabric, as indicated in Fig. 13, the sheds are formed or forming by the descent of the shed-forming fingers. This portion of the operation is important in order that the warps may be put under sufficient strain to properly hold the beaten-up wefts in position.

On reference to Figs. 11 and 14 it will be seen that the fell of the fabric is at a point adjacent to the first shed-forming recess of the bars 22, and it therefore becomes necessary to operate the take-up and move the finished fabric for a distance equal to the length of fabric manufactured at each beat up during the beating-up operation. To accomplish this, I employ a feed-roll 190, over which the fabric passes to the cloth-roll or similar receiving device, (not shown,) on which the finished fabric is wound. The roll 190 is provided with a spindle 191, to which is secured a ratchet-wheel 192, having a number of teeth, the length of each tooth being equal to the distance between wefts Nos. 1 and 4 in the finished fabric. On the spindle 191 is hung an arm 193, carrying a spring-pressed pawl 194, and said arm is connected by an arm 195 to a grooved cam 196, mounted on the auxiliary cam-shaft 46. The arm 195 is guided in any suitable manner and is preferably provided, in common with the other cam-actuated arms, with an antifriction-roller adapted to enter the cam-groove. The cam 196 is so timed as to start its take-up movement simultaneously with the starting of the beating-up movement and to complete such movement in advance of the beating up of wefts Nos. 1 and 2, so that the fabric will be in proper position for beating up before the completion of the beating-up movement.

For the formation of fabrics of different pattern the arrangement of the beating-up fingers and the contour of the operating-cam will be altered, and the fingers may be so arranged as to leave the fabric successively or simultaneously, as desired.

In Fig. 19 is illustrated a form of close-mesh ratan fabric which may be woven by beating-up fingers arranged as illustrated in Fig. 20. The fingers in this case are of gradually-increasing height from front to rear, and in using a machine provided with beating-up fingers arranged in this manner the cam 168 will be provided with a number of shoulders for giving a number of successive movements to the carrying-spindles of the beating-up bars, so that the fingers may leave the finished fabric successively. In this manner after the fingers of the first bar are withdrawn the fingers of the second bar will carry the second weft close up to the weft deposited by the fingers of the first bar and will in turn be withdrawn from the fabric, leaving the third and fourth fingers to operate successively and in similar manner.

Having thus described the invention, what I claim is—

1. In a loom, means for forming a plurality of successive parallel sheds, means for inserting wefts therein, and means independent of the weft-inserting means for beating up said wefts.

2. In a loom, means for simultaneously forming a plurality of successive parallel sheds, means for inserting wefts therein, and means independent of the weft-inserting means for beating up said wefts.

3. In a loom, means for forming a plurality of successive parallel sheds, means for simultaneously inserting a corresponding number of wefts therein, and means independent of the weft-inserting means for beating up said wefts.

4. In a loom, a shed-forming means adapted to operate on a portion of the warps, to form a plurality of successive parallel sheds, the remaining portions remaining in a substantially straight line to form the opposite half of the shed, means for inserting wefts in said sheds, and means independent of the weft-inserting means for beating up the wefts.

5. In a loom, means for forming a plurality of successive parallel sheds, means for simultaneously inserting a corresponding number of wefts therein, and means independent of the weft-inserting means for beating up the wefts and disposing the same in proper positions in the fabric in accordance with a predetermined pattern.

6. In a loom, means for forming a plurality of parallel sheds, means for simultaneously inserting a corresponding number of wefts therein, a beating-up means for forcing the wefts to proper position in the fabric, and mechanism controlling said beating-up means to effect the disengagement of a portion thereof in advance of the completion of the beating-up movement.

7. In a loom, means for forming a plurality of parallel sheds, means for inserting a corresponding number of wefts therein, a plurality of beating-up devices adapted to engage one with each of the wefts, and mechanism for effecting the disengagement of a portion of the beating-up devices in advance of the completion of the beating-up movement.

8. In a loom, means for forming a plurality of parallel sheds, means for inserting a corresponding number of wefts therein, a plurality of beating-up devices adapted to engage one with each of the wefts, and mechanism for operating the beating-up devices to effect first a successive and then a simultaneous movement of said beating-up devices.

9. In a loom, means for forming a plurality of parallel sheds, means for inserting a corresponding number of wefts therein, means for independently engaging each of said wefts and for simultaneously moving the same to position in the fabric.

10. In a loom, means for forming a plurality of parallel sheds, means for inserting a corresponding number of wefts therein, means for successively engaging the warps and for simultaneously moving the same in spaced relation to beating-up position, and means for moving a portion of said engaging devices to inoperative position in advance of the completion of the beating-up movement.

11. In a loom, means for forming a plurality of parallel sheds, means for inserting wefts therein, a plurality of beating-up devices adapted to engage one with each of the inserted wefts, means for causing an initial independent movement of the beating-up devices to successively engage the same with their respective wefts, means for simultaneously moving all of the beating-up devices in the direction of the web, and means for causing the disengagement of the foremost beating-up devices from the wefts in advance of the completion of the beating-up movement.

12. In a loom, means for forming a plurality of sheds, means for inserting wefts therein, a plurality of beating-up devices adapted to engage one with each of the inserted wefts, means for causing an initial movement of the beating-up devices to successively engage the same with their respective warps and for subsequently effecting a simultaneous movement of all of the beating-up devices in the direction of the web, and means for causing the disengagement of a portion of the beating-up devices during the beating-up movement.

13. In a loom, a series of recessed bars, means for guiding warps over said bars, shedding-fingers having forwardly-curved warp-engaging portions, and means for operating said fingers to effect the depression of selected warps into the recesses.

14. In a loom, a shed-forming mechanism comprising a series of recessed bars, means for guiding a pair of warps over each of said bars, and means for depressing said warps into alternate recesses.

15. In a loom, a shed-forming mechanism comprising a series of recessed bars, means for guiding a pair of warps over each of said bars, and means for depressing the first warp of each pair into the first recess and into alternate recesses throughout the length of the bar and for forcing the second warp of the pair into the intervening recesses, substantially as specified.

16. In a loom, a shed-forming mechanism comprising a series of recessed bars each having at one end grooved guides for the reception of warp-threads, means for depressing the warps into such guides, and means for depressing the warps alternately into the recesses of the bars to thereby form a multiple shed.

17. In a loom, a shed-forming mechanism comprising a series of recessed bars, means for guiding warps over said bars, and warp engaging and depressing fingers having recessed lower faces for the reception of said warps.

18. In a loom, a shed-forming mechanism comprising a series of recessed bars, a pair of rocker-arms, means for operating the same, a plurality of finger-supporting bars carried by said rocker-arms, and shed-forming fingers carried by said bars and adapted to depress warp-threads into the recesses of the bars.

19. The combination with shed-forming mechanism and weft-inserting means, of a pair of pivotally-mounted spindles, a plurality of beating-up bars having fingers adapted to engage said wefts, concentrically-disposed sleeves mounted upon the spindles and carrying said bars, means for imparting a beating-up movement and a returning movement to the bars, and means for raising and lowering the free ends of the spindles, substantially as specified.

20. In combination, means for forming a plurality of parallel sheds, means for simultaneously inserting wefts therein, a pair of pivotally-mounted spindles, concentrically-disposed sleeves mounted on said spindles and having a limited independent movement thereon, means for regulating the extent of opening and closing movement of said sleeves, a beating-up bar carried by each pair of sleeves, means for traveling the sleeves on the spindles to effect the beating-up and the return movement, and means for raising and lowering the free ends of said spindles.

21. In combination, means for forming a plurality of parallel sheds, means for simultaneously inserting wefts therein, a pair of pivotally-mounted spindles, concentrically-disposed sleeves capable of a limited independent movement on said spindles, beating-up bars carried by the respective sleeves, said bars being provided with bolt-receiving openings of gradually-increasing size throughout the series of bars, a shouldered bolt passing through each alining series of openings and secured to one of said bars, means for moving the bars to and from beating-up position, and means for raising and lowering the free ends of the spindles.

22. In combination, means for forming a plurality of parallel sheds, means for simultaneously inserting wefts therein, a pair of spindles arranged below the fabric-line, a plurality of sleeves mounted on said spindles and having spaced flanges or collars, beating-up bars carried by said sleeve, shouldered bolts for limiting the spacing movement of said bars, springs for retaining the bars in spaced relation, and means for moving the bars to and from beating-up position.

23. In a device of the class specified, a warp-tension mechanism comprising a pivoted frame to receive and guide each warp, a pivoted gripping-jaw carried by the frame and engaging the warp, and means for adjusting the gripping movement of the jaw.

24. In a device of the class specified, a warp-tension device comprising a pivoted frame for the reception of each warp, a pivoted gripping-jaw carried thereby and engaging the warp, an auxiliary pivoted frame having stops for limiting the extent of movement of the tension-frames, tension-springs connecting said frames independently to the auxiliary frame, and means for positively moving said auxiliary frame.

In testimony that I claim the foregoing as my own I have hereto affixed my signature in the presence of two witnesses.

EDWARD POWELL.

Witnesses:
JNO. E. PARKER,
S. N. ACKER.